United States Patent [19]
Honkomp et al.

[11] Patent Number: 5,219,936
[45] Date of Patent: Jun. 15, 1993

[54] HIGH IMPACT PVC/POLYCARBONATE ALLOY COMPOSITIONS

[75] Inventors: David J. Honkomp, Covington, Ga.; Nicolai A. Favstritsky; Enrico J. Termine, both of Lafayette, Ind.

[73] Assignee: Great Lakes Chemical Corporation, W. Lafayette, Ind.

[21] Appl. No.: 817,661

[22] Filed: Jan. 7, 1992

[51] Int. Cl.$^5$ .................... C08L 69/00; C08L 27/06
[52] U.S. Cl. ............................... 525/67; 525/133; 525/146; 525/147; 525/148
[58] Field of Search ............... 525/67, 133, 146, 148, 525/147

[56] References Cited

U.S. PATENT DOCUMENTS

| | | | |
|---|---|---|---|
| 3,882,192 | 5/1975 | Elghani | 525/67 |
| 4,105,711 | 8/1978 | Hardt | 525/67 |
| 4,500,665 | 2/1985 | Brecker | 524/487 |
| 4,504,624 | 3/1985 | Heuschen | 525/67 |
| 4,507,434 | 3/1985 | Ranade | 525/67 |
| 4,680,343 | 7/1987 | Lee | 525/148 |

OTHER PUBLICATIONS

Material Safety Data Sheet for Durastrength 200; Atochem Three Parkway, Philadelphia, Pa. 19102.
*Modern Plastics*, Sep. 1990 p. 137.
Durastrength 200; product literature of M & T Chemicals Rahway, N.J.
Durastrength 200 Impact Modifier; product literature of M & T Chemicals Rahway, N.J.

*Primary Examiner*—David J. Buttner
*Attorney, Agent, or Firm*—Woodard, Emhardt, Naughton Moriarty & McNett

[57] ABSTRACT

A preferred rigid thermoplastic resin composition having high impact strength and resistance to thermal distortion includes a vinyl chloride resin/polycarbonate alloy and at least 3 parts by weight of butadiene-modified acrylic per 100 parts by weight of the alloy. A particularly preferred thermoplastic resin composition includes the alloy and both butadiene-modified acrylic and ethylene-vinyl acetate copolymer.

19 Claims, No Drawings

HIGH IMPACT PVC/POLYCARBONATE ALLOY COMPOSITIONS

BACKGROUND OF THE INVENTION

1. Field of the Invention

This invention generally relates to impact and thermal distortion resistant thermoplastic resin compositions, and more particularly relates to impact-modified polyvinyl chloride/polycarbonate alloy compositions.

2. Description of the Prior Art

Polyvinylchloride (PVC) is a high volume, relatively inexpensive polymer. However, the use of PVC is often limited because it lacks properties required for many service applications. Efforts to develop PVC blends or alloys with other materials which meet the demands of commercial service applications have therefore continued.

For example, PVC alone lacks the dimensional stability under heat required for many service applications. To address this problem, it is known to alloy PVC with polycarbonate to form an alloy composition having dimensional stability under heat surpassing that of PVC alone. For example, Abdrakhmanova et al., SU 84-3788283, 31 Aug. 1984, describe a mixture of 100 parts polyvinyl chloride and 1-8 parts oligomeric bisphenol A polycarbonate. PVC/polycarbonate alloys, however, often lack acceptable impact strength. Efforts have therefore been made to discover impact modifiers that can be added to PVC/polycarbonate alloys to make an overall composition having both acceptable impact strength and dimensional stability under heat.

In this connection, U.S. Pat. No. 3,882,192 issued to Elghani et al. in 1975 describes molding compositions consisting of 5-95 parts by weight of a polycarbonate, 5-95 parts by weight of a vinyl chloride polymer, and 5-95 parts by weight of an acrylonitrile butadiene styrene copolymer or a styrene/maleic anhydride copolymer or an ethylene-vinyl acetate copolymer.

On the other hand, U.S. Pat. No. 4,680,343 issued to Lee in 1987 describes chlorinated polyvinyl chloride (CPVC) alloys containing aromatic polycarbonates, ethylene-based functional polymers and optionally an impact modifier. The Lee patent notes that CPVC and PVC are different materials and that PVC prior art is not analogous to patentability issues relating to CPVC since PVC processes easily and CPVC does not, since CPVC has heat resistance but PVC does not, and furthermore, since CPVC has a high melt viscosity but PVC does not.

Despite these and other efforts, the need continues for PVC/polycarbonate alloy compositions having high impact properties. Efforts to find such compositions have been frustrated because the effects of differing impact modifiers on PVC/polycarbonate blends vary greatly, and it is thus difficult to discover impact modifiers which provide overall alloys having high impact and other desirable properties.

The applicant's invention now addresses this need and provides impact and thermal distortion resistant PVC alloys having other advantageous properties as well.

SUMMARY OF THE INVENTION

One preferred embodiment of the invention provides a rigid thermoplastic resin composition having high impact strength and resistance to thermal distortion. The thermoplastic resin composition includes an alloy of a vinyl chloride resin and a polycarbonate (hereinafter sometimes referred to as a "vinyl chloride resin/polycarbonate alloy"). The thermoplastic composition further includes at least about 3 parts by weight of a butadiene-modified acrylic ("BMA") impact modifier per 100 parts by weight of the vinyl chloride resin/polycarbonate alloy. This composition demonstrates highly advantageous physical and chemical properties, including for instance superior impact strength as can be measured by the Gardner impact test, as well as high resistance to heat distortion.

As another feature of the invention, a particularly preferred thermoplastic resin composition includes both butadiene-modified acrylic and an ethylene-vinyl acetate (EVA) copolymer. It has been discovered that using these two impact modifiers together can provide synergistic results in which high impact properties are retained while the composition has greater ductility than similar compositions modified only with the individual impact modifiers.

Still another preferred embodiment of the invention provides a method for preparing a thermoplastic resin composition having high impact strength and resistance to heat distortion. This method includes the step of incorporating into a vinyl chloride resin/polycarbonate alloy an effective amount of butadiene-modified acrylic polymer to increase the impact strength of the alloy.

Additional aspects, features and preferred embodiments of the invention will be apparent from the following description.

DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As stated, one preferred embodiment of the invention provides a composition including a vinyl chloride resin/polycarbonate alloy. As indicated previously, such alloys are generally known. The vinyl chloride resin in the alloy can be polyvinyl chloride itself or a copolymer of vinyl chloride (typically at least 80 percent by weight) with another vinyl monomer. Representative vinyl comonomers include vinylidine halides, vinyl esters such as vinyl acetate, vinyl propionate, vinyl butyrate, vinyl chloroacetate, vinyl benzoate, acrylic and alpha-alkyl acrylic acids and their alkyl esters, amides and nitriles such as acrylic acid, methacrylic acid, methyl methacrylate, ethyl acrylate, 2-ethyl-hexyl acrylate, butyl methacrylate, acrylamide, N-methyl acrylamide, acrylonitrile and methacrylonitrile, aromatic vinyl compounds such as styrene and vinyl naphthalene, olefinically unsaturated hydrocarbons such as ethylene, etc. The vinyl chloride resin will typically have a molecular weight of 40,000 to 60,000. The vinyl chloride resin can be obtained commercially or can be conventionally prepared, for example by emulsion, suspension, bulk or mass polymerization. The vinyl chloride resin is preferably one suitable for rigid applications, advantageously having an intrinsic viscosity of about 0.68 to about 0.74 (ASTM method) which provides ease in processing. For additional information as to PVC and related polymers, reference can be made to The Encyclopedia of PVC, Marcel Dekker, Inc., New York (1977).

Many aromatic polycarbonates are known and suitable for use in alloying with vinyl chloride resins. These polycarbonates are commonly based on dihydroxy aromatic compounds such as divalent phenols, e.g. hydroquinone, resorcinol, 4,4′-dihydroxydiphenyl, bis-4(hydroxyphenyl)-alkanes, -cycloalkanes, -ethers, -sulphones or -ketones, bisphenols including those which are halogenated in the nucleus, and alpha, alpha′-bis-(p-hydroxyphenyl)-p-diisopropyl-benzene, trinuclear. Preferred phenols are bisphenols such as bisphenol A (4,4′-dihydroxy-di-phenylpropane-(2,2) and halogenated derivatives thereof such as tetrabromobisphenol A. Preferred polycarbonates will have the general formula:

H—[OROC]$_n$—OROH where n is greater than or equal to 2 on average and R is a group including an aromatic radical (mono- or polynuclear) which is derived from the particular dihydroxy aromatic compound used.

Suitable polycarbonates are available commercially or can be prepared using techniques familiar to those working in the area and published in the literature. For example, as is known, aromatic polycarbonates can be formed by phosgenation of aromatic dihydroxy compounds in the presence of pyridine, by interfacial polycondensation (optionally end-blocked with suitable agents) between aromatic dihydroxy compounds in aqueous alkaline solutions with phosgene or bischlorocarbonic acid esters of aromatic dihydroxy compounds in the presence of inert solvents, or by transesterification. For additional information as to polycarbonates, reference can be made to the available patent and other literature including, for example, U.S. Pat. Nos. 3,554,514; 4,005,037; 4,105,711; 4,239,861; 4,513,119; 4,515,925 and 4,814,421, all of which describe various polycarbonates and their preparation. The average molecular weight of the aromatic polycarbonate polymers will typically range from about 10,000 to about 200,000. The average molecular weight of carbonate oligomers (generally where n averages about 2 to 4 in the above formula) will typically range from about 1000 to about 12000, depending on the specific starting materials and preparative procedures employed. One preferred polycarbonate is CN-1427, a tribromophenol-terminated carbonate oligomer of tetrabromobisphenol A, commercially available from Great Lakes Chemical Corporation, Lafayette, Ind., U.S.A.

The polyvinyl chloride resin/polycarbonate alloy itself may be rich in either component, and accordingly typically contains 5% to 100% by weight vinyl chloride resin and 5% to 95% polycarbonate. More preferably the vinyl chloride resin/polycarbonate alloy contains about 50% to 95% vinyl chloride resin and about 5% to 50% polycarbonate.

The butadiene-modified acrylic impact modifier may be obtained commercially or may be prepared by conventional polymerization procedures. Preferred butadiene-modified acrylic impact modifiers are polymers of alkyl esters of 2-alkyl-2-propenoic acids with butadiene and alkyl 2-propenoates (usually these alkyl groups are $C_1$ to $C_4$ alkyls). One preferred modifier is a 2-propenoic acid, 2-methyl-methyl ester polymer with 1,3-butadiene and butyl 2-propenoate, known as Durastrength 200 and commercially available from Atochem North America of Philadelphia, Pa., U.S.A. The BMA is preferably included in at least 3 parts by weight per one hundred parts by weight of the vinyl chloride resin/polycarbonate alloy and will usually be included in the range of 3 to 1000 parts by weight per 100 parts by weight of said alloy. In more preferred compositions, the BMA is included in the range of about 3 to 50 parts per 100 parts of the vinyl chloride resin/polycarbonate alloy.

In a highly preferred embodiment, the above-described composition further includes an ethylene-vinyl acetate ("EVA") copolymer. It has been discovered that the combination of an EVA copolymer and a BMA polymer provides a composition which retains high impact properties and thermal distortion resistance and has an unexpected increase in ductility. In fact, the ductility of such compositions is substantially greater than that provided by either impact modifier alone.

For example, a PVC/polycarbonate alloy modified with butadiene-modified acrylic exhibited 17% ductile breaks in the Gardner impact strength test, and in a similar test a PVC/polycarbonate alloy modified with EVA exhibited 10% ductility. On the other hand, a PVC/polycarbonate alloy modified with both of these materials dramatically exhibited 83% ductility in the same test. Highly improved thermoplastic resin compositions are thus provided having properties which are desirable for building applications that must withstand installation and the intended service life without cracking or splitting. Suitable ethylene-vinyl acetate impact modifiers are available commercially or can be prepared using procedures known to the art and to the literature such as high-pressure, emulsion or suspension polymerization. Typically, these impact modifiers will have a molecular weight between 10,000 and 500,000 and will contain 1-80% by weight of vinyl acetate. A preferred EVA impact modifier is Levapren 450 N, available from Mobay Chemical Corp. of Pittsburgh, Pa., U.S.A.

The ethylene-vinyl acetate and butadiene-modified acrylic will generally be included in effective amounts to increase both the impact strength and the ductility of the alloy (as can be measured by the Gardner impact test). Particularly preferred compositions will exhibit impact strengths of at least about 2 in.-lb./mil. and ductilities of at least about 50% in the Gardner impact strength test. In most cases, the BMA and EVA impact modifiers will each be included in the range of 3 to 1000 parts by weight per one hundred parts by weight of the vinyl chloride resin/polycarbonate alloy, and more typically each between about 3 and 30 parts by weight per one hundred parts by weight of the vinyl chloride resin/polycarbonate alloy.

Of course, the compositions of the invention can also include various other conventional components. For example, they may optionally contain viscosity improvers, lubricants, stabilizers, antioxidants, colorants, etc.

The components of the inventive compositions may be blended in any suitable manner, but are preferably mixed while molten. This can be accomplished by any suitable known means, for instance by using a two-roll mill, a compounding screw extruder, a twin screw extruder, etc. The compositions can be molded, extruded, etc. into materials suitable for end use applications such as automotive trim, construction products, e.g. building and house siding and panels, window profiles and accessories, etc.

All publications cited herein are hereby incorporated by reference.

To promote a further understanding of the invention and its features and advantages, the following specific examples are provided. It will be understood that these examples are illustrative, and not restrictive, of the invention.

EXAMPLES 1-8

Into a container were weighed 700 grams polyvinyl chloride resin (0.68 I.V.), 35 grams titanium dioxide, 21 grams dibutyltin maleate, 16.1 grams acrylic processing aid, 9.1 grams calcium stearate, 3.5 grams paraffinic wax, and 70 grams of an impact modifier as specified in Table 1. These components were mixed well and one-half of the resulting mixture was transferred to another container. To the second container were added 210 grams of CN-1427 (from Great Lakes Chemical Corporation). The contents of the first container were placed on a 175°-190° C. two-roll mill, depending on the formulation, and processed until melting and band formation occurred. The material in the second container was slowly added until a homogenous composition was formed. The sheet was removed and allowed to cool. In the case of the PVC control without the polycarbonate or impact modifier, a second container was not used. The sheet was cut up into approximate 4" × 4" pieces with a band saw, then granulated to ¼ inch or less particles with a power grinder.

The granulated sample was fed into a 30-ton Newbury injection molder fitted with a mold containing ⅛" deep cavities for ASTM standard tensile, flexural, heat distortion temperature, and impact test bars. The processing conditions were 33 seconds cycle time and 195°-205° C. melt temperature depending on the formulation.

This procedure was repeated for the PVC and polycarbonate controls and each of the impact modifiers which were tested. The compositions were then tested for impact strength, heat distortion temperature and other physical properties. The data is presented in Table 1 tility) and Example 6 (EVA alone, 10% ductility). These results thus demonstrate the highly surprising synergistic compositions obtained by including both BMA and EVA.

While the invention has been described in detail in the foregoing description, the same is to be considered as illustrative and not restrictive in character, it being understood that only the preferred embodiments have been described and that all changes and modifications that come within the spirit of the invention are desired to be protected.

What is claimed is:

1. A rigid thermoplastic resin composition having high impact strength and resistance to thermal distortion, comprising a polyvinyl chloride resin/aromatic polycarbonate alloy, at least 3 parts by weight of an ethylene-vinyl acetate copolymer impact modifier per 100 parts by weight of said alloy, and at least 3 parts by weight of a butadiene-modified acrylic impact modifier per 100 parts by weight of said alloy.

2. The composition of claim 1 which exhibits a Gardner impact strength of at least about 2 in.-lb./mil.

3. The composition of claim 1 wherein the butadiene-modified acrylic and the ethylene-vinyl acetate copolymer are each included in about 3 to 30 parts by weight per 100 parts by weight of said alloy.

4. The composition of claim 3 which exhibits a Gardner impact strength of at least about 2 in.-lb./mil.

5. The composition of claim 3 which exhibits at least 50% ductility in the Gardner impact test.

6. The composition of claim 4 which exhibits at least 50% ductility in the Gardner impact test.

7. The composition of claim 6 wherein the polycarbonate is derived from a tetrahalobisphenol A.

8. The composition of claim 6 wherein the tetrahalobisphenol A is tetrabromobisphenol A.

9. The composition of claim 8 wherein the polycarbonate is a tribromophenyl-terminated tetrabromobisphenol A polycarbonate.

10. A rigid thermoplastic resin composition having high impact strength, ductility and resistance to thermal distortion, comprising a polyvinyl chloride resin/aromatic polycarbonate alloy and effective amounts of butadiene-modified acrylic and ethylene-vinyl acetate

TABLE 1

| Example | | | | | | | | |
|---|---|---|---|---|---|---|---|---|
| Polycarbonate (phr) | — | 30 | 30 | 30 | 30 | 30 | 30 | 30 |
| Impact Mod. Type (phr) | | | | | | | | |
| Acrylic | — | — | 10 | — | — | — | — | — |
| Butadiene-modified acrylic | — | — | — | 10 | — | — | — | 10 |
| Chlorinated polyethylene | — | — | — | — | 10 | — | — | — |
| Ethylene-vinyl acetate | — | — | — | — | — | 10 | — | 5 |
| Nitrile rubber | — | — | — | — | — | — | 10 | — |
| ASTM D 4226, A (⅛") | | | | | | | | |
| Mean failure energy (in.-lb./mil.) | 0.80 | 0.22 | 1.8 | 2.8 | 2.0 | 1.8 | 2.2 | 2.8 |
| % Ductile breaks | 0 | 0 | 0 | 17 | 0 | 10 | 0 | 83 |
| ASTM D 648, (⅛") | | | | | | | | |
| 264 psi, °C. | 62 | 71 | 70 | 71 | 72 | 71 | 67 | 70 |
| ASTM D 638 | | | | | | | | |
| Tensile strength (psi) | 8210 | 8990 | 7820 | 7950 | 7980 | 7380 | 7490 | 7440 |
| Tensile modulus (psi) | 372,000 | 372,900 | 315,600 | 355,400 | 345,400 | 298,200 | 347,900 | 340,600 |
| Elongation (%) | 17 | 17 | 23 | 18 | 16 | 17 | 29 | 29 |

As can be seen, the formulation of Example 4, containing BMA (Durastrength 200 from Atochem), exhibited the highest Gardner impact strength (2.8 in.-lb./mil.). The formulation of Example 8, containing both BMA and EVA, exhibited 83% ductility whereas the compositions of Example 4 (BMA alone, 17% duccopolymer to increase the impact strength and ductility of said alloy.

11. The composition of claim 10 which exhibits an impact strength of at least about 2 in.-lb/mil. and a ductility of at least 50% in the Gardner impact test.

12. The composition of claim 11 wherein the polycarbonate is derived from a bisphenol A derivative.

13. The composition of claim 12 wherein the bisphenol A derivative is a tetrahalobisphenol A.

14. The composition of claim 1 wherein the tetrahalobisphenol A is tetrabromobisphenol A.

15. The composition of claim 14 wherein the polycarbonate is a tribromophenyl-terminated tetrabromobisphenol A polycarbonate.

16. A method for preparing a rigid thermoplastic resin composition having high impact strength and resistance to thermal distortion, comprising incorporating into a polyvinyl chloride resin/polycarbonate alloy effective amounts of a butadiene-modified acrylic impact modifier and an ethylene-vinyl acetate copolymer impact modifier to increase the impact strength and ductility of the alloy in the Gardner impact test.

17. The method of claim 16 which includes the step of incorporating an effective amount of the butadiene-modified acrylic impact modifier and ethylene-vinyl acetate copolymer impact modifier so that the composition exhibits an impact strength of at least about 2 in.-lb./mil. in the Gardner impact test and at least about 50% ductility in the Gardner impact test.

18. The method of claim 17 in which the polycarbonate is derived form a bisphenol A derivative.

19. The method of claim 17 in which the polycarbonate is derived form tetrabromobisphenol A.

* * * * *